United States Patent [19]

Itoh et al.

[11] Patent Number: 5,046,813

[45] Date of Patent: Sep. 10, 1991

[54] METHOD AND APPARATUS FOR ALIGNING A PLURALITY OF SINGLE-FIBER CABLES, AND METHOD OF SIMULTANEOUSLY FUSION-SPLICING SUCH CABLES

[75] Inventors: Kenichiroh Itoh, Sakura; Mikio Yoshinuma, Yachiyo, both of Japan

[73] Assignee: Fujikura Ltd., Tokyo, Japan

[21] Appl. No.: 402,896

[22] Filed: Sep. 1, 1989

[30] Foreign Application Priority Data

Sep. 7, 1988 [JP] Japan .................................. 63-223988
Sep. 7, 1988 [JP] Japan .................................. 63-223989

[51] Int. Cl.⁵ .............................................. G02B 6/38
[52] U.S. Cl. ........................................... 385/96; 385/97
[58] Field of Search ........................ 350/96.21, 96.22; 219/121

[56] References Cited

U.S. PATENT DOCUMENTS

| | | | |
|---|---|---|---|
| 4,148,559 | 4/1979 | Gauthier | 350/96.21 |
| 4,274,707 | 6/1981 | Pacey et al. | 350/96.20 |
| 4,350,867 | 9/1982 | Kinoshita et al. | 219/121 |
| 4,715,876 | 12/1987 | Osaka et al. | 350/96.21 X |
| 4,725,297 | 2/1988 | Grigsby | 350/96.21 X |
| 4,812,010 | 3/1989 | Osaka et al. | 350/96.21 X |
| 4,911,524 | 3/1990 | Itoh et al. | 350/96.21 |
| 4,914,797 | 4/1990 | Tsuchida et al. | 350/96.21 X |

FOREIGN PATENT DOCUMENTS 0278423 8/1988 European Pat. Off. ......... 350/96.22

Primary Examiner—John D. Lee
Assistant Examiner—Phan T. Heartney
Attorney, Agent, or Firm—Frishauf, Holtz, Goodman & Woodward

[57] ABSTRACT

An apparatus for aligning a plurality of single-fiber cables, comprises a base, a cover hinged to the base and forming a gap along with the base when closed, and a pair of arms inserted in the gap and movable within the gap, for aligning the single-fiber cables in the same plane. To align single-fiber cables by means of the apparatus, the cables are arranged on the base, one after another. Then, the cover is closed, whereby the cables are located in the gap between the base and the cover. The arms or the pawl members, which are inserted in the gap, are moved, thereby putting the cables together and placing them parallel to one another in the same plane, any cable not forced above so that it rides atop another. The cables, thus aligned, can easily be held by a holder designed for multi-fiber cables.

10 Claims, 16 Drawing Sheets

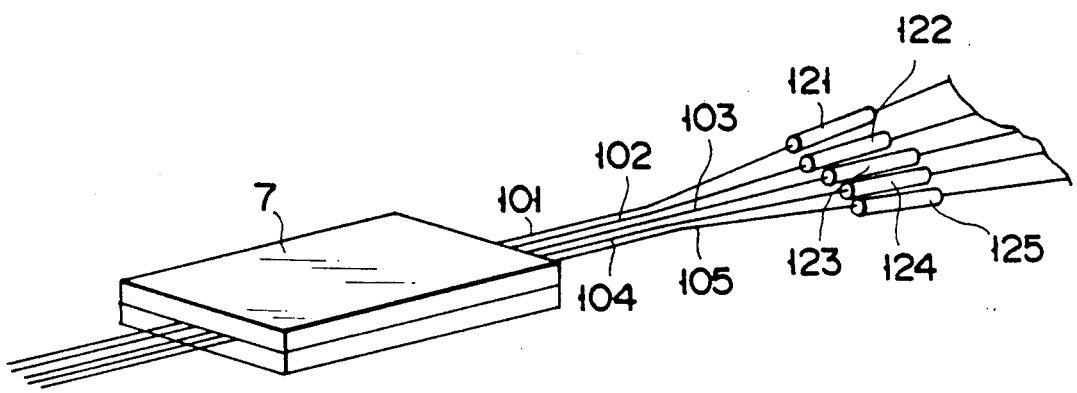
F I G. 7A
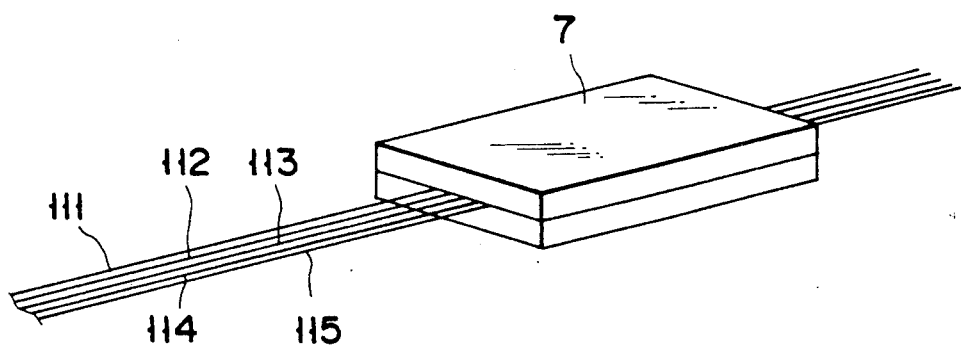
F I G. 7B

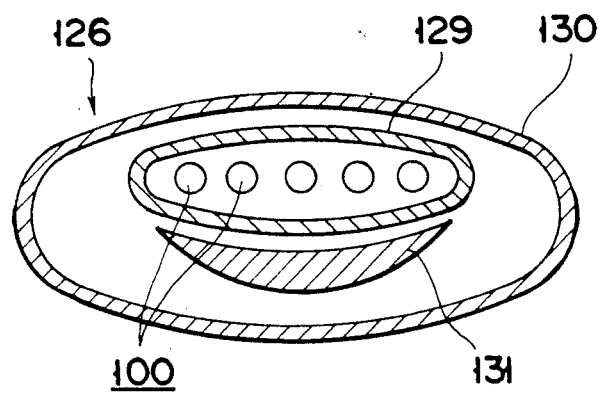
F I G. 12

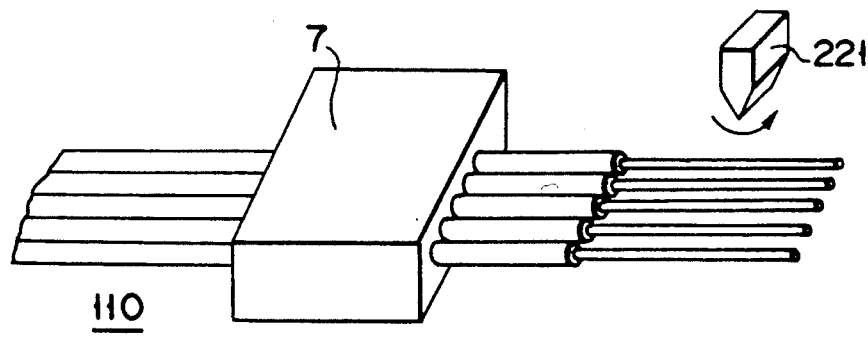
F I G. 17
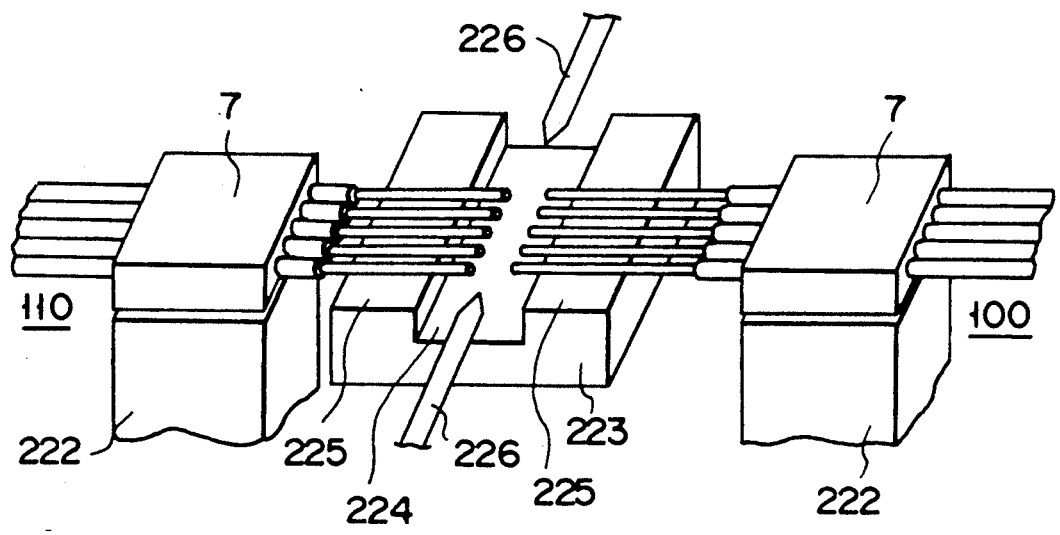
F I G. 18

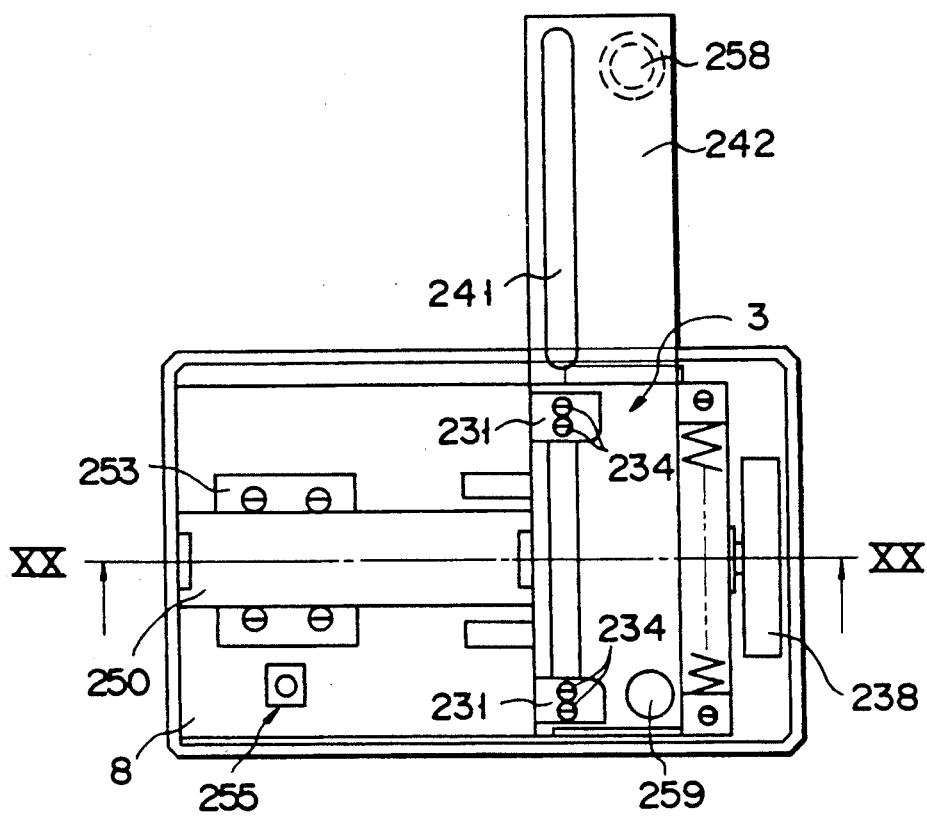
F I G. 19
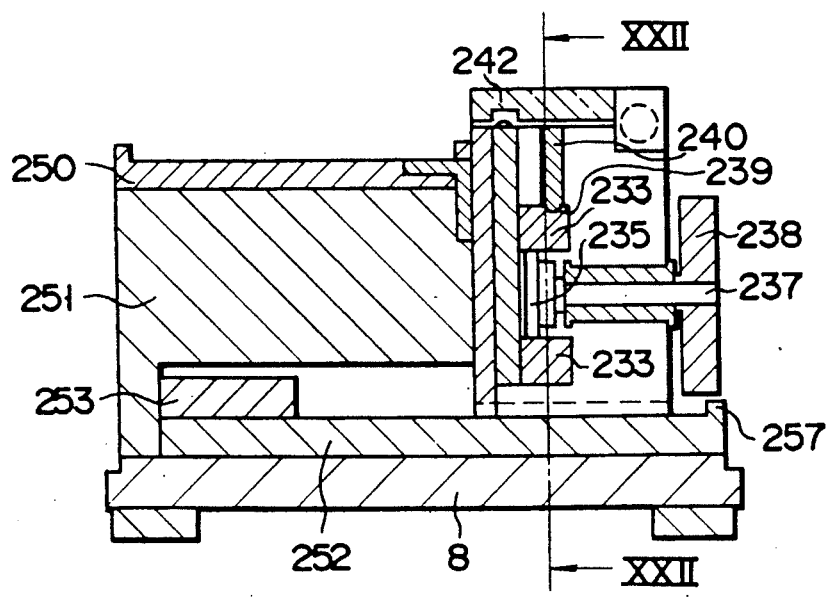
F I G. 20

5,046,813

METHOD AND APPARATUS FOR ALIGNING A PLURALITY OF SINGLE-FIBER CABLES, AND METHOD OF SIMULTANEOUSLY FUSION-SPLICING SUCH CABLES

BACKGROUND OF THE INVENTION

1. Field of the Invention

The present invention relates to a method and an apparatus for aligning a plurality of single-fiber cables, and also to a method of simultaneously fusion-splicing single-fiber cables.

2. Description of the Related Art

To fusion-splice a number of single-fiber cables each comprising a coated optical fiber, each pair of cables is fusion-spliced by means of a fusion-splicing apparatus designed for single-fiber cables. Specifically, those portions of the sheaths which cover the ends of the cables are removed, thus exposing the end portions of the cables, which are then cleaned. Thereafter, the end portions are cut such that each has a face such as facilitates their fusion-splicing, and the end portions are fusion-spliced to each other.

This processes, i.e. removing the sheaths from the end portions of a pair of single-fiber cables, cleaning and then cutting and fusion-splicing the end portions of the fibers, usually takes 15 to 30 minutes. Since using a fusion-splicing apparatus designed for single-fiber cables, it is not possible to fusion-splice more than one pair of single-fiber cables at a time.

Accordingly, a time-saved method has been proposed to permit a plural pairs of single-fiber cables to be fusion-spliced at the same time, wherein individual cables are held parallel to one another in the same plane by a holder designed specifically for holding a multi-fiber cable called a ribbon type cable, and the end portions of the cables of each pair are simultaneously fusion-spliced by means of an apparatus designed for fusion-splicing multi-fiber cables.

The aligning of the cables is performed by means of a cable-aligning apparatus having a plurality of pairs of pins arranged in two parallel rows and spaced a predetermined distance apart from each other. By setting the end portion of a cable to be fusion-spliced to another cable in the gap between an adjacent pair of pins of the first row and also in that between a corresponding pair of pins of the second row, the cable are aligned parallel to one another. The cables thus aligned are set in the groove of the holder designed for the multi-fiber cable. However, using this type of apparatus necessitates that those portions of the cables which extend from the holder be relatively long. Further, the more cables are required to be aligned, the larger the apparatus becomes. Moreover, this device has the drawback in that to set each cable in the gaps between the corresponding two pairs of pins of the first and second rows, thereby to set the cable ultimately in the groove of the fiber, is time consuming.

SUMMARY OF THE INVENTION

Accordingly, it is an object of the present invention to provide a method by means of which a plurality of single-fiber cables can be aligned with relative ease, and wherein each cable being aligned is required only to have a short excess portion.

Another object of the invention is to provide an apparatus which is small and can align single-fiber cables.

A further object of this invention is to provide a method of simultaneously fusion-splicing a plurality of single-fiber cables aligned by means of the apparatus according to the invention.

According to the present invention, there is provided a method of aligning a plurality of single-fiber cables, comprising the steps of:
placing single-fiber cables on a base;
closing a cover thereby inserting the single-fiber cables in a gap between the base and the cover, said gap being substantially equal to the diameter of the single-fiber cables; and
moving a pair of a pair of arms inserted in said gap, thereby aligning the single-fiber cables in the same plane.

According to the present invention, there is further provided an apparatus for aligning a plurality of single-fiber cables, comprising:
a base;
a cover hinged to said base and forming a gap along with the base when closed, said gap being substantially equal to the diameter of the single-fiber cables; and
a pair of arms inserted in said gap and movable within said gap, for aligning the single-fiber cables in the same plane.

According to the present invention, there is still further provided a method of fusion-splicing a plurality of single-fiber cables, comprising the steps of:
passing single-fiber cables of a first group through reinforcing tubes made of heat-shrinking material;
aligning the cables of the first group and also the single-fiber cables of a second group, by means the cable-aligning apparatus as described above;
holding the cables of both groups by means of two cable holders;
setting the fiber holders in a fusion-splicing apparatus designed for fusion-splicing multi-fiber cables, such that the ends of the cables of the first group oppose those of the cables of the second group;
operating the fusion-splicing apparatus, thereby fusion-splicing the cables of the first group simultaneously to the cables of the second group;
moving the reinforcing tubes to the fusion-spliced portions of the cables of both groups, and
heating the reinforcing tubes to shrink the tube, thereby simultaneously reinforcing the fusion-spliced portions of the cables of both groups.

According to the present invention, there is further provided a method of aligning a plurality of single-fiber cables, comprising the steps of:
placing single-fiber cables on a base;
closing a cover thereby inserting the single-fiber cables in a gap between the base and the cover, said gap being substantially equal to the diameter of the single-fiber cables; and
moving a pair of pawl members inserted in said gap, thereby aligning the single-fiber cables in the same plane.

According to the invention, there is yet further provided an apparatus for aligning a plurality of single-fiber cables, comprising:
a base;
a cover hinged to said base and forming a gap along with the base when closed, said gap being substantially equal to the diameter of the single-fiber cables; and a pair of pawl members inserted in said gap and movable within said gap, for aligning the single-fiber cables in the same plane.

According to the present invention, there is further provided a method of fusion-splicing a plurality of single-fiber cables, comprising the steps of:

passing single-fiber cables of a first group through reinforcing tubes made of heat-shrinking material;

aligning the cables of the first group and also the single-fiber cables of a second group, by means the cable-aligning apparatus as described just above;

holding the cables of both groups by means of two cable holders;

setting the fiber holders in a fusion-splicing apparatus designed for fusion-splicing multi-fiber cables, such that the ends of the cables of the first group oppose those of the cables of the second group:

operating the fusion-splicing apparatus, thereby fusion-splicing the cables of the first group simultaneously to the cables of the second group;

moving the reinforcing tubes to the fusion-spliced portions of the cables of both groups, and heating the reinforcing tubes to shrink the tube, thereby simultaneously reinforcing the fusion-spliced portions of the cables of both groups.

To align single-fiber cables by means of the apparatus according to the invention, the cables are arranged on the base, one after another. Then, the cover is closed, whereby the cables are located in the gap between the base and the cover. Since the gap is substantially equal to the diameter of the cables, the cables can be moved in this gap. The arms or the pawl members, which are inserted in the gap, are moved, thereby putting the cables together and placing them parallel to one another in the same plane, any cable not forced above so that it rides atop another. The cables, thus aligned, can easily be held by a holder designed for a multi-fiber cable.

Prior to fusion-splicing the single-fiber cables of a first group to those of a second group by means of the method according to the present invention, the cables of the first group are inserted through the reinforcing tubes. Then, these cables are aligned with the cables of the second group by means of the apparatus described above. Alternatively, the cables can be aligned so, before they are inserted through the reinforcing tubes. The cables of both groups are held by means of a fiber holder. The fiber holder holding these cables is set into an apparatus designed for fusion-splicing multi-fiber cables. This apparatus is operated, thereby fusion-splicing the cables of both groups simultaneously. Thereafter, the reinforcing tubes are moved to the fusion-spliced portions of the cables, and are heated, thereby reinforcing the fusion-spliced portions of the cables of both groups at the same time.

BRIEF DESCRIPTION OF THE DRAWINGS

FIGS. 7A and 7B are perspective views, each showing the cable holder and two groups of single-fiber cables held by the holder;

FIG. 12 is a cross-sectional view illustrating the reinforcing tube shown in FIG. 9 or 10;

FIGS. 16 to 18 are perspective views, illustrating how the end portions of the single-fiber cables of either group are cut and fusion-spliced to the end portions of the single-fiber cables of the other group, by means of a fusion-splicing apparatus.

FIG. 19 is a plan view of a cable-aligning apparatus according to a third embodiments of this invention, in which the cable holder supporting arrangement is retracted;

FIG. 20 is a sectional view showing the cable-aligning apparatus, taken along line XX—XX in FIG. 19;

DETAILED DESCRIPTION OF THE PREFERRED EMBODIMENTS

Embodiments of the present invention will now be described, with reference to the accompanying drawings.

Figure 1:
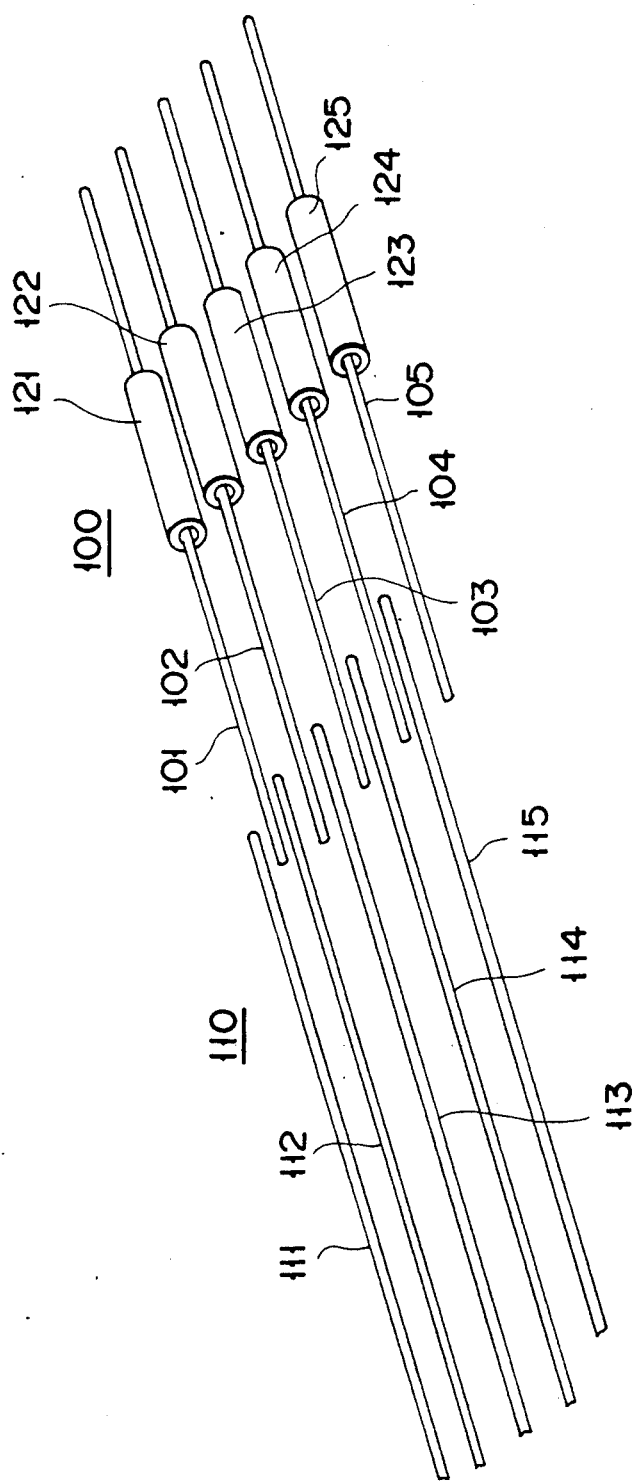
FIG. 1 is a perspective view illustrating a first group of single-fiber cables and a second group of single-fiber cables, which are to be fusion-spliced.

FIG. 1 illustrates two groups 100 and 110 of single-fiber cables. For simultaneously fusion-splicing the five single-fiber cables 101 to 105 of the first group 100 to the five single-fiber cables 111 to 115 of a second group 110, the cables of the first group 100 are inserted through five reinforcing tubes 121 to 125, respectively. The tubes 121 to 125 are moved far from those ends of the cables 101 to 105 which are to be fusion-spliced to the cables 111 to 115 of the second group 110. Then, the end portions of the cables 101 to 105 are placed on a cable-aligning apparatus 10 (later described), and are aligned by means of the apparatus 10. The end portions of the cables 101 to 105, thus aligned, are held by a cable holder 7. The end portions of the cables 111 to 115 of the second group 110 are aligned by the apparatus 10 and held by another holder, in the same way as the end portions of the cables 101 to 105.

The cables 101 to 105 of the first group 100 can be inserted into the reinforcing tubes 121 to 125 while their end portions are being aligned by means of the cable-aligning apparatus 10, not before these end portions are aligned.

Figure 2:
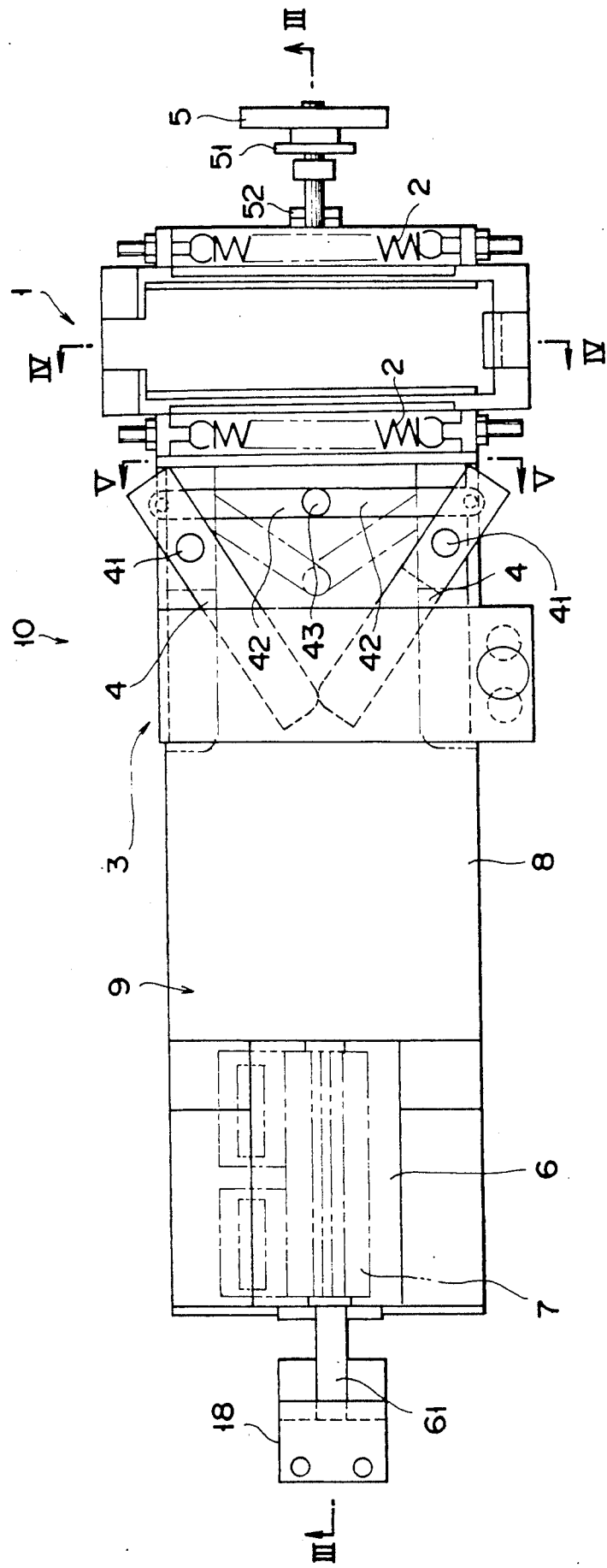
FIG. 2 is a plan view showing a cable-aligning apparatus according to a first embodiment of the present invention.
Figure 3:
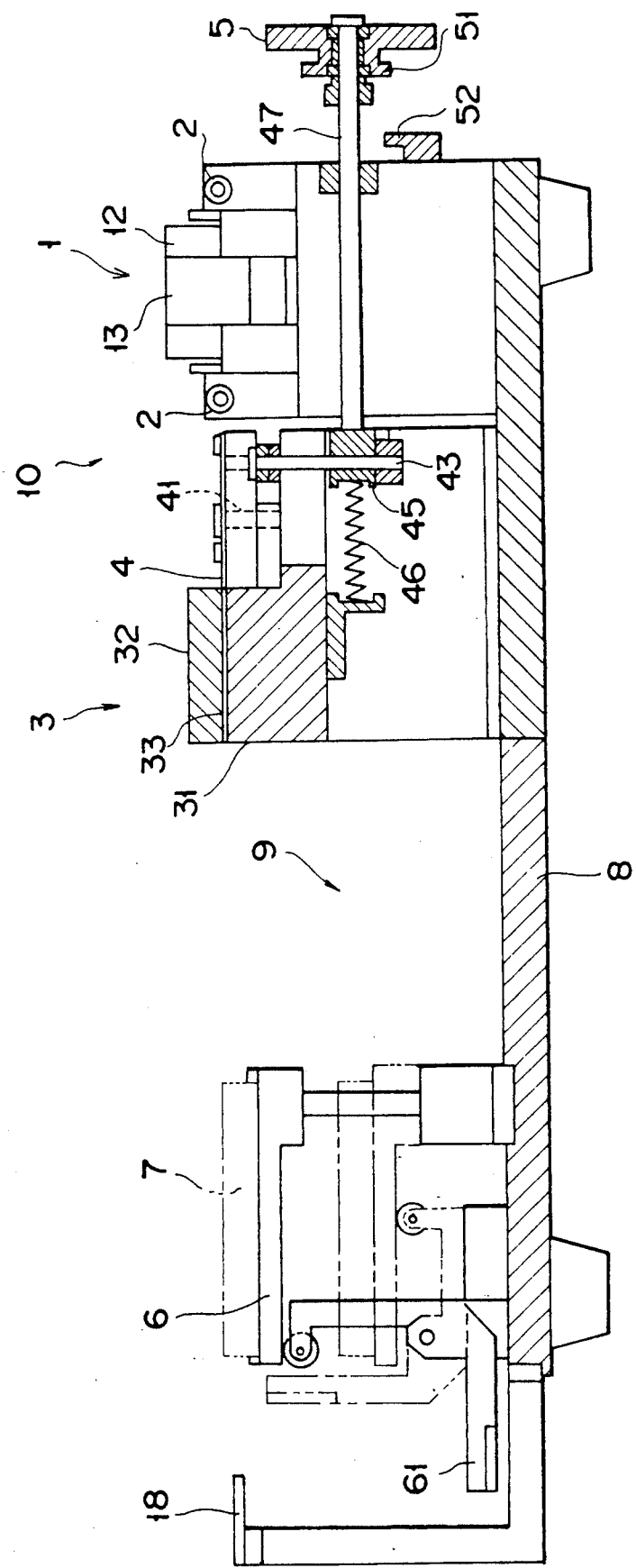
FIG. 3 is a sectional view of the cable-aligning apparatus shown, taken along line III—III in FIG. 2.
Figure 4:
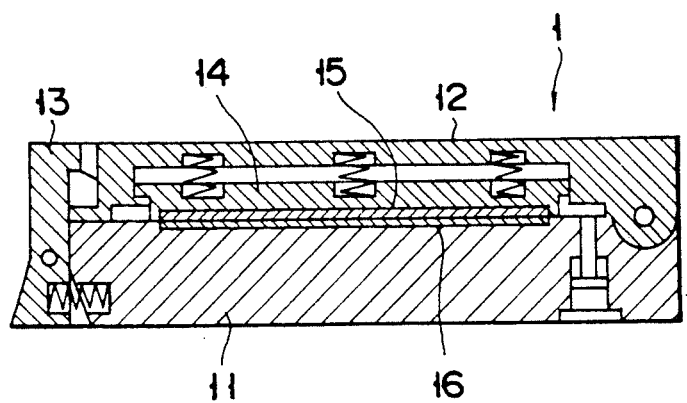
FIG. 4 is a cross-sectional view of the clamper incorporated in the apparatus, taken along line VI—VI in FIG. 2.
Figure 5:
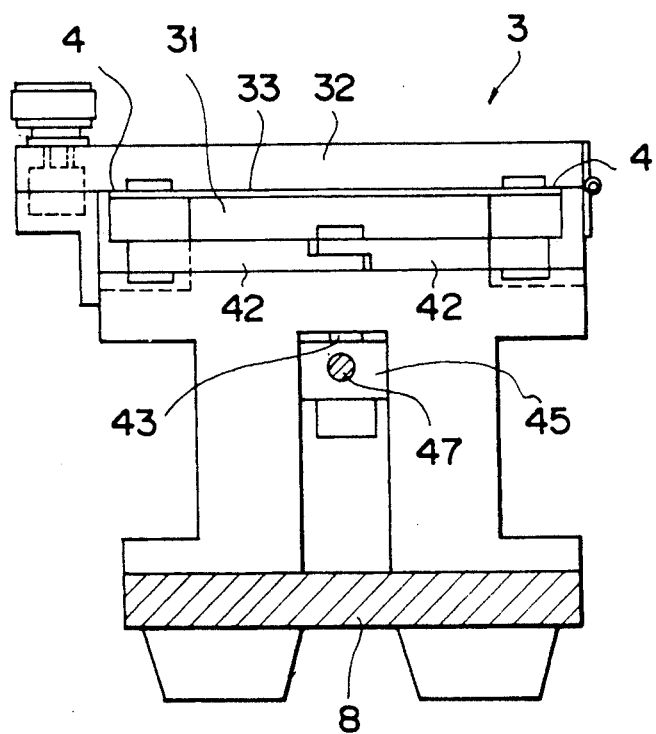
FIG. 5 is a partially sectional side view of the apparatus, taken along line V—V in FIG. 2 and as viewed in the direction of the arrows shown in FIG. 2.

The cable-aligning apparatus 10 will be described, with reference to FIGS. 2 to 5. FIG. 2 is a plan view of the apparatus, FIG. 3 is a cross-sectional view of the apparatus, taken along line III—III in FIG. 2. FIG. 4 is also a cross-sectional view of the apparatus, taken along line VI—VI in FIG. 2. FIG. 5 is a partially sectional side view of the apparatus, taken along line V—V in FIG. 2.

As is shown in FIGS. 2 to 5, the cable-aligning apparatus 10 comprises a frame 8, a clamper 1, a cable-aligning table 3, an elevator 6, and a table 18. The clamper 1, the table 3, and the elevator 6 are mounted on the frame 8. The clamper 1 and the cable-aligning table 3 are located close to each other, and the table 3 and the elevator 6 are spaced apart from each other, with a space 9 between them.

As is shown in FIG. 3, two coil springs 2 are located on the left and right sides of the clamper 1. The coil springs 2 are used to hold single-fiber cables among their turns. The cable holder 7 is mounted on the elevator 6.

The clamper 1 is designed to hold single-fiber cables. As is illustrated in FIG. 4, the clamper 1 comprises a base 11, a cover 12 hinged to the base 11, a fastener 13 for fastening the cover 12 to the base 11, thereby to hold cover 12 in the closed position, a holding plate 14 connected to the inner surface of the cover 12 by springs, and two rubber plates 15 and 16 bonded to the base 11 and the plate 14, respectively. When the cover 12 is set in the closed position after single-fiber cables are placed on the base 11, the cables are clamped between the rubbers plates 15 and 16 since the holding plate 14 is biased toward the base 11 by the springs.

As is shown in FIG. 5, the cable-aligning table 3 comprises a base 31 and a cover 32 hinged to the base 31. When the cover 32 is set in the closed position, a gap 33 is formed between the base 31 and the cover 32. This gap is substantially equal to the diameter of the single-fiber cables to be aligned. More specifically, the gap is about 0.3 mm when the cables have a diameter of 0.25 mm as most single-fiber cables commonly used at present.

Two cable-aligning arms 4 are inserted in the gap 33 between the base 31 and the cover 32. The arms 4 have a thickness less than the gap 33, and are rotatably supported by two pins 41, respectively. Those end portions of the arms 4, which are close to the pins 41, are coupled to two link members 42, respectively. These link members 42 are connected to each other by a pin 43 and can rotate around this pin 43. These pins 43 are rotatably attached to a movable block 45 which is biased toward the right (FIG. 3) by a spring 46. A shaft 47 is fastened to the movable block 45. A handle 5 is coupled to the free end of the shaft 47. A engagement plate 51 is connected to the handle 5. When the handle 5 is rotated in one direction, the plate 51 is moved to the left (FIG. 3) and goes into engagement with a hook 52 fixed to the right side of the frame 8. When the handle 5 is rotated in the opposite direction, the plate 51 is moved to the right and comes out of engagement with the hook 52.

The elevator 6 has a lever 61. The elevator 6 is used to raise the cable holder 7 to a predetermined level. Usually, the elevator 6 is put in a lowered position, as is represented by two-dot, one-dash lines in FIG. 3. While the elevator 6 remains in the lowered position, the single-fiber cables 101 to 105 of the second group are aligned and held by the holder 7. Then, the lever 61 is rotated downward, thus raising the cable holder 7 to the predetermined level.

This table 1 is used for supporting the end portions of the single-fiber cables 101 to 105 held by the cable holder 7. The table 1 is located, with its left edge located at a distance of, for example, 40 mm from the left end of the cable holder 7. Hence, when the cables 101 to 105 are aligned by the cable-aligning table 3, held by the cable holder 7, and supported on the table 18, with their ends aligned with the left edge of the table 18, those portions of them which extend from the the left end of the holder 7 have the same length of 40 mm. It follows that those portions of the cables 101 to 105 which extend from the left edge of the cable-aligning table 3 are of the same length. This makes it easier than otherwise to mount the reinforcing tubes 121 to 125 onto these portions of the cables 101 to 105, while the cables 101 to 105 are being aligned by means of the cable-aligning table 3.

The space 9 allows for the mounting of the tubes 121 to 125 onto the single-fiber cables 101 to 105. It extends at least 40 mm in the horizontal direction.

The cable-aligning apparatus 10, described above, is operated in the following manner, in order to align the single-fiber cables 101 to 105.

First, the handle 5 is rotated until the plate 51 moves to the left, going into engagement with the hook 52. As a result, the movable block 45 and the shaft 43 are moved to the left, and the link members 42, both coupled to the block 45 by the pins 43, are moved such that both cable-aligning arms 4 are opened. At the same time, the cover 32 of the cable-aligning table 3 is also opened. Next, the cover 12 of the clamper 1 is opened. The single-fiber cables 101 to 105 are placed on the base 31 of the cable-aligning table 3. Their end portions, which are to be fusion-spliced to the cables 111 to 115, are placed on the table 18, and their portions more proximal are clamped among the turns of the two coil springs 2, one located on the left of the clamper 1 and the other located on the right of the clamper 1. The reinforcing tubes 121 to 125 are mounted onto those portions of the cables 101 to 105 which are located in the space 9. The left ends of the cables 101 to 105 are aligned with the left edge of the table 18, whereby the end portions extending from the left end of the cable holder 7 have the same length of about 40 mm. Since the cables 101 to 105 are clamped or held by the springs 2, they do not cross each other before the cover 12 of the clamper 1 is closed. Once the cover 12 is closed and fastened to the base 31 by means of the fastener 13, the single-fiber cables 101 to 105 are clamped more firmly between the rubber plates 15 and 16.

Thereafter, the handle 5 is rotated, thus moving the plate 51 to the right (FIG. 3) until the plate 51 comes out of engagement with the hook 52. Hence, the movable block 45, biased by the spring 46, also moves to the right, and so do the pins 43. As a result, both link members 42 move such that the cable-aligning arms 4 approach each other, putting the cables 101 to 105 together. Since the gap 33 between the base 31 and the cover 32 of the table 3 is substantially equal to the diameter of the cables 101 to 105, any of these cables is not forced above so that it rides atop another. Hence, the cables 101 to 105 are aligned parallel, in the same plane.

As has been described, the reinforcing tubes 121 to 125 are mounted on the single-fiber cables 101 to 105 before these cables are aligned by means of the cable-aligning table 3. Nevertheless, according to the present invention, the tubes can be mounted on the cables 101 to 105 after these cables have been aligned by means of the table 3.

After the cables 101 to 105 have been aligned by means of the clamper and the cable-aligning table 3, those portions extending from the left end of the table 3 are straightened up by pushing down the end portions on the table 18 and pulling them away from the table 3 with fingers, and are then aligned parallel to one another by moving the fingers toward or away from one another. While holding these portions of the cables 101 to 105 thus aligned, the operator rotates the lever 61 downward. As a result, the cable holder 7 mounted on the elevator 6 is raised to the predetermined level, to hold the cables 101 to 105.

Figure 6:
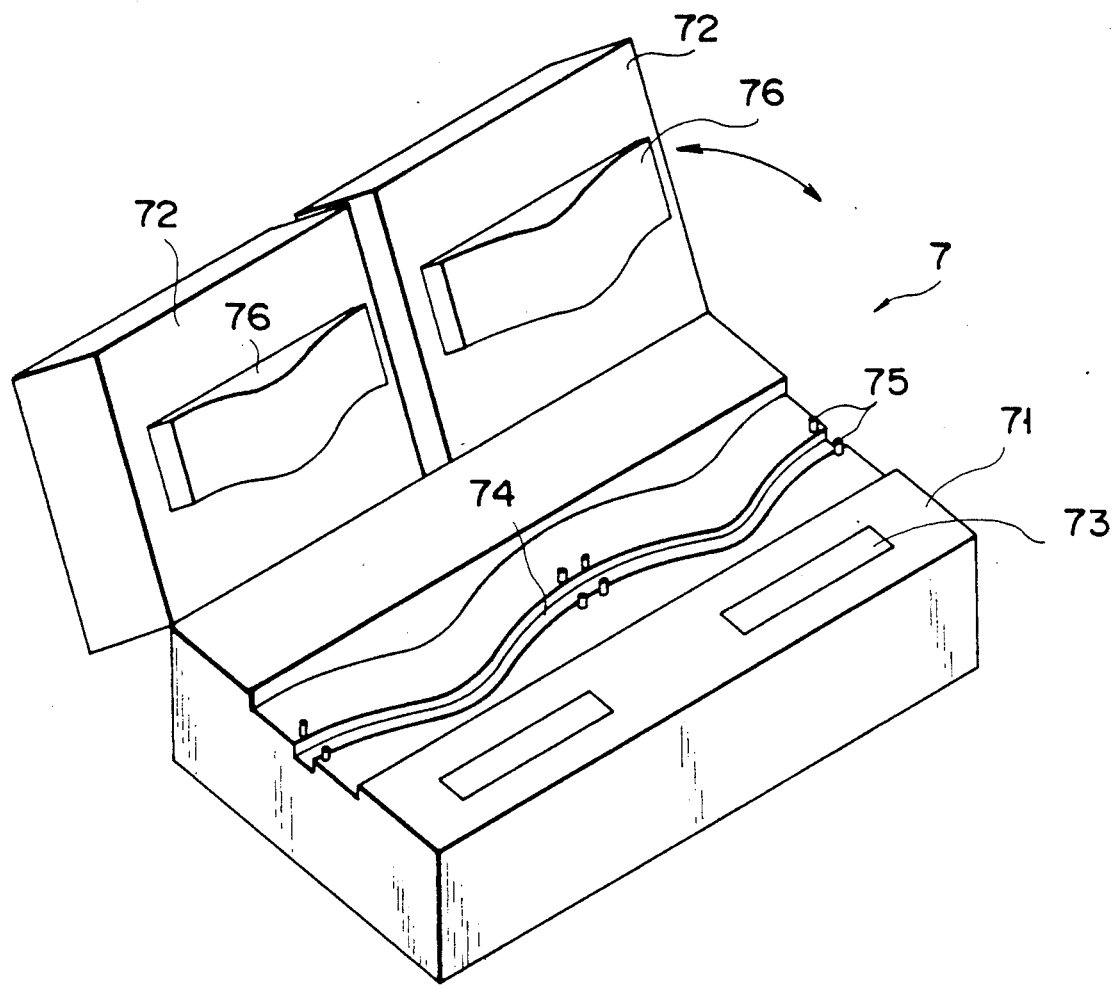
FIG. 6 is a perspective view showing a cable holder which is in an opened position.
Figure 8:
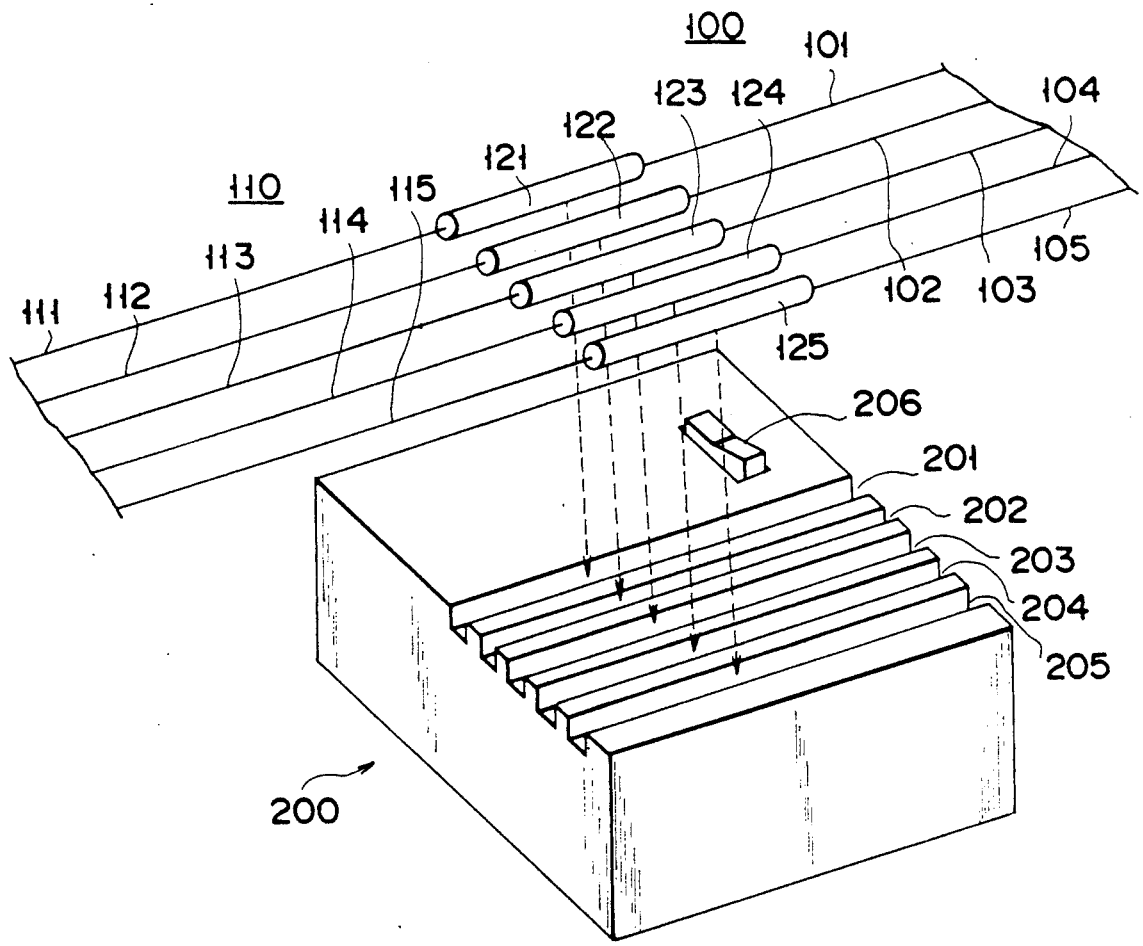
FIG. 8 is a perspective view illustrating reinforcing tubes, the cables of two groups, whose fusion-spliced portions are inserted through the reinforcing tubes, and a device for heating the tubes to reinforce the fusion-spliced portions of the cables.

The cable holder 7 is of the same structure as the known type designed for holding a multi-fiber cable. As is shown in FIG. 6, the holder 7 comprises a base 71 and two covers 72 hinged to the base 71. One groove 74 is made in the upper surface of the base 71. Pairs of guide pins 75 protrude from the upper surface of the base 71, the two pins 75 of each pair opposing each other across the groove 74. Two cable-pressing member 76 are formed on the inner surfaces of the covers 72, respectively. When these covers 72 are closed, the cable-pressing members 76 press the single-fiber cables 101 to 105, thus firmly holding these cables in the groove 74. The upper surface of the base 71 are curved in the lengthwise direction of the groove 74, and the cable-pressing members 76 have a surface curved complemental to the upper surface of the base 71. This structural feature increases the friction between the cables placed in the groove 74, on the one hand, and the bottom of the groove 74 and cable-pressing members 76, on the other, thus preventing the cables 101 to 105 from slipping in the groove 74. The width of the groove 74 is determined by the number of single-fiber cables to be held together, and the depth of the groove 74 is determined by the diameter of these cables.

The cable holder is operated to hold the single-fiber cables 101 to 105, in the following way. First, both covers 72 are opened, and the cables 101 to 105 are placed partly in the groove 74 and partly between the guide pins 75. Then, the covers 72 are closed, thus holding the cables 101 to 105 within the groove 74, aligned parallel, in the same fashion as in a multi-fiber cable.

After the single-fiber cables 101 to 105 have been held by means of the cable holder 7, the cover 12 of the clamper 1 and the cover 32 of the cable-aligning table 3 are opened. Further, the cables 101 to 105 are removed from the coil springs 2. As a result, only the end portions of these cables, which are held by the cable holder 7, remain aligned parallel to one another as is illustrated in FIG. 7A.

The single-fiber cables 111 to 115 of the second group are aligned by means of the same cable-aligning apparatus 10, in the same way as the cables 101 to 105 of the first group. As a result, those end portions of the cables 111 to 115, which are to be fusion-spliced to the cables 101 to 105, are held by a cable holder 7 as is illustrated in FIG. 7B.

The cables 101 to 105 of the first group and the cables 111 to 115 of the second group, thus held by the holders 7, are processed so as to be fusion-spliced, in the same way as a multi-fiber cable held by the holder of the same type. More specifically, the sheaths are removed from the end portions of the cables of either group, by means of the stripper designed for removing the sheath from a multi-fiber cable. The exposed portions of the optical fibers are cleaned. Then, they are simultaneously cut such that they have flat faces, by means of a cutter for cutting the fibers of the multi-fiber cable (for example, CT-03 manufactured by Fujikura Cable, Co., Ltd.).

The holder 7 holding the end portions of the cables 101 to 105, and the holder 7 holding the end portions of the cables 111 to 115, are set in a fusion-splicing apparatus designed for fusion-splicing multi-fiber cables, such as FSM-20R manufactured by Fujikura Cable Co., Ltd. More precisely, the end portions of the exposed fibers of the cables 101 to 105 are set in alignment with, and in end-to-end contact with those of the exposed fibers of the cables of the cables 111 to 115. Thereafter, the cables 101 to 105 of the first group 100 and the cables 111 to 115 of the second group 110 are simultaneously fusion-spliced, by operating of the fusion-splicing apparatus.

The two holders 7 holding the cables 101 to 105 and 111 to 115, which have been fusion-spliced, are removed from fusion-splicing apparatus. Then, the cables 101 to 105 and the cables 111 to 115, now fusion-spliced together, are removed from the holders 7. As a result of this, five long single-fiber cables are made. The reinforcing tubes 121 to 125 are moved until they are mounted on the fusion-spliced portions of the long cables. The reinforcing tubes 121 to 125 sheathing these fusion-spliced portions are inserted into the grooves 210 to 205 of a reinforcing device 200. The power switch 206 of the device 200 is then turned on, whereby the tubes 121 to 125 are heated. The reinforcing tubes 121 to 125, which are made of heat-shrinking material, shrink and grip the fusion-spliced portions of the single-fiber cables, reinforcing the fusion-spliced portions.

As has been explained in detail, the single-fiber cables of either group are aligned parallel to one another by the cable-aligning apparatus 10, and those end portions of these cables thus aligned, which are to be fusion-spliced with the end portions of the single-fiber cables of the other group, are then held by the holder. Therefore, the end portions of the cables of both groups are stripped, cleaned, fusion-spliced, and reinforced—at the same time. Hence, the cable-aligning apparatus 10 helps to reduce the time for fusion-splicing single-fiber cables.

Figure 9:
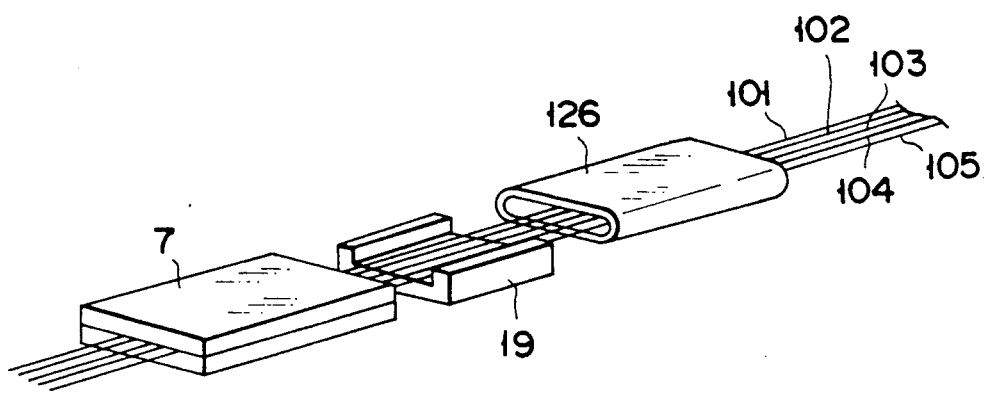
FIG. 9 is a perspective view showing the cables, which are held by a holder and arranged on a mold.
Figure 10:
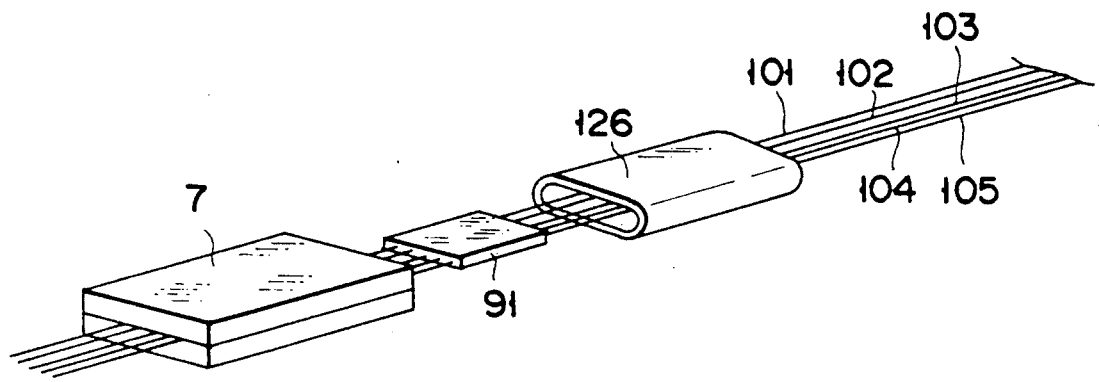
FIG. 10 is a perspective view illustrating the cables, which are held by a holder.

In the embodiment described above, one reinforcing tube is used to reinforce the fusion-spliced end portions of each pair of single-fiber cables. When it is required that two or more single-fiber cables be combined, the fusion-spliced portions of these cables should better be reinforced by means of a single reinforcing tube 126 made of heat-shrinking material. In the case of the cables 101 to 105 of the first group 100, before they are removed from the holder 7, a mold 19 is located right behind the cable holder 7, as is illustrated in FIG. 9. This mold 19 is filled with resin which hardens when irradiated with ultraviolet rays. The single-fiber cables 101 to 105, still aligned parallel to one another by means of the holder 7, are placed in the mold 19 and, thus, dipped in the resin filled therein, as is illustrated in FIG. 9. Then, ultraviolet rays are applied to the resin, and the resin hardens, forming a block 91 fastening the cables 101 to 105 together, as is shown in FIG. 10. The block 91 is removed from the mold 19, and the single-fiber cables 101 to 105 are removed from the holder 7. The single-fiber cables 111 to 115 of the second group 110 are also fastened by a resin block in the same way as the cables 101 to 105, and then removed from the cable holder 7.

Alternatively, the single-fiber cables of either group can be fastened by means of adhesive tape or adhesive material, instead of the resin. If this is the case, the adhesive tape is wrapped around the cables, thereby fastening the cables aligned parallel in the same plane. Then, the single-fiber cables of either group, thus fastened and aligned, are removed from the cable holder 7.

Further alternatively, the fiber cables can be fastened by means of a paste-like material comprising an inorganic filler, a wetting agent, and a binder. The inorganic filler can be calcium hydrogenphosphate or aluminium oxide. The wetting agent can be sorbitol solution or propylene glycol. The binder can be sodium carboxymethylcellulose. An experimentation was performed, using a paste composed of such materials. In the experimentation, the paste was applied on the fiber cables to the degree that the grooves formed between the cables are filled with the paste. The result was preferable. Specifically, the fibers applied with the paste were kept binded to each other during the heating process for the reinforcing tubes. Further, after the heating process, the fiber cables could be easily separated by pushing the binded portion of the cables by a finger of the operator.

The cable 101 to 105, now fastened together by the resin block 91, the adhesive tape or the paste, and the cables 111 to 115, also fastened together by the resin block 91, the adhesive tape or the paste, are set in the fusion-splicing apparatus designed for fusion-splicing multi-fiber cables. The fusion-splicing apparatus is operated, thereby fusion-splicing the cables 101 to 105 to the cables 101 to 105, respectively.

After the cables of the first group 100 and those of the second group 110 have been fusion-spliced, the reinforcing tube 126 is moved to, and mounted on, the fusion-spliced portions of these cables. Then, the tube 126, covering the fusion-spliced portions of the cables, is set in a reinforcing device (not shown) which has only one groove. More precisely, the reinforcing tube 126 is placed in the groove of the device. The power switch of this reinforcing device is turned on, thereby heating the tube 126. The tube 126 shrinks, thus reinforcing the fusion-spliced portions of the cables 101 to 105 and 111 to 115.

According to the invention, the mold 19 can be located in the space 9, or between the cable-aligning table 3 and the fiber holder 7, so that the single-fiber cables are fastened together by a resin block 91 while they are held parallel to each other by means of the cable holder 7.

Figure 11:
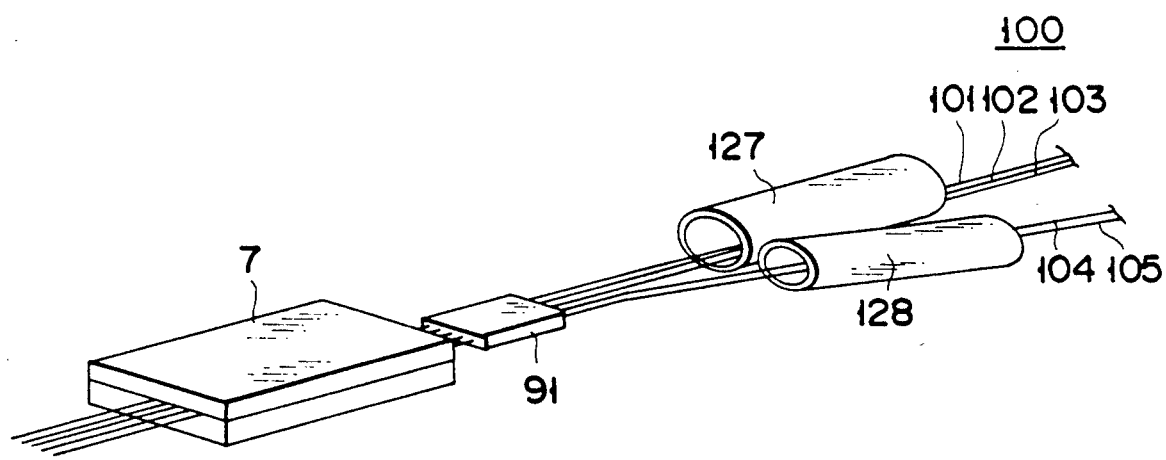
FIG. 11 also shows the cable, which are held by a holder.

Moreover, according to the invention, the fusion-spliced portions of some pairs of single-fiber cables are reinforced by a tube, whereas the those of the remaining pairs of the cables are reinforced by another tube. For instance, as is shown in FIG. 11, three cables 101 to 103 of the first group 100 are inserted through a reinforcing tube 127 which is made of heat-shrinking material, and the other two cables 104 and 105 of the first group 100 are inserted through another reinforcing tube 128 also made of heat-shrinking material, before these cables 101 to 105 are aligned or while they are being aligned. Then, the fibers 101 to 105 are held parallel to one another by a cable holder 7 and fastened together by a resin block 91 in the same way as has been described. In the means time, the single-fiber cables 111 to 115 of the second group 111 are aligned and held by a cable holder 7. The cables 101 to 105 are fusion-spliced to the cables 111 to 115 by the fusion-splicing apparatus. Then, the reinforcing tube 127 is moved to, and mounted on, the fusion-spliced portions of the cables 101 to 103 and 111 to 113, and the reinforcing tube 128 is moved to, and mounted on, those of the cables 104 and 105 and 114 and 115. Next, the tube 127, covering the fusion-spliced portions of the cables 101 to 103 and 111 to 113, and the tube 128 covering those of the cables 104 and 105 and 114 and 115, are set in a reinforcing device (not shown) which has two grooves. To be more precise, the reinforcing tubes 127 and 128 are placed in the grooves of the device. The power switch of the reinforcing device is turned on, thereby heating both tubes 127 and 128. The tubes 127 and 128 shrink, thereby reinforcing the fusion-spliced portions of the cables 101 to 105 and 111 to 115.

The reinforcing tubes 126, 127, and 128, shown in FIGS. 10 and 11, have the same structure. They have different sizes in accordance with the number of single-fiber cables they are to hold. Hence, the tubes 127 and 128, which hold three cables and two cables, respectively, are smaller than the tube 126 which holds five cables, and the tube 128 is smaller than the tube 127. Only the reinforcing tube 126 will be described in greater detail with reference to FIG. 12 which is a cross-sectional view. As is shown in this figure, the tube 126 comprises two coaxial tubes 129 and 130, both made of heat-shrinking material, and a reinforcing plate 131 made of ceramics, having a crescent cross section, and interposed between the inner tube 129 and the outer tube 130. The single-fiber cables 101 to 105 are passed through the inner tube 129.

Figure 13:
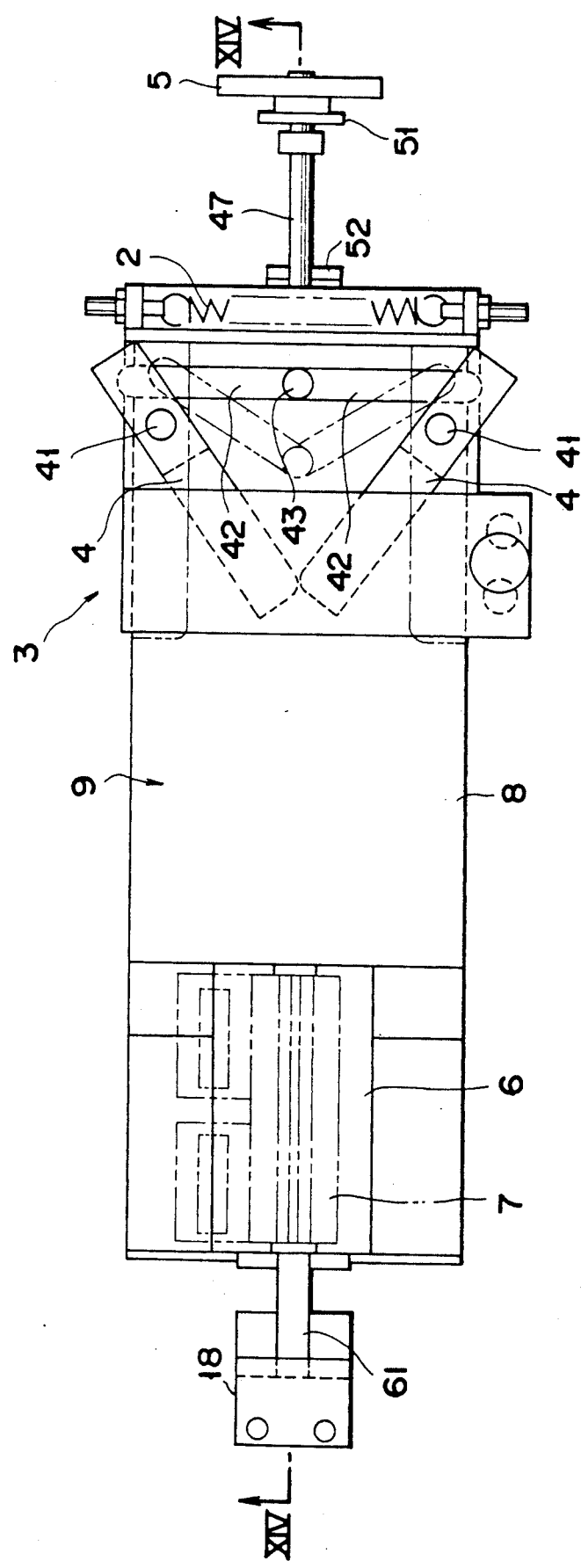
FIG. 13 is a plan view of a cable-aligning apparatus according to a second embodiment of this invention.
Figure 14:
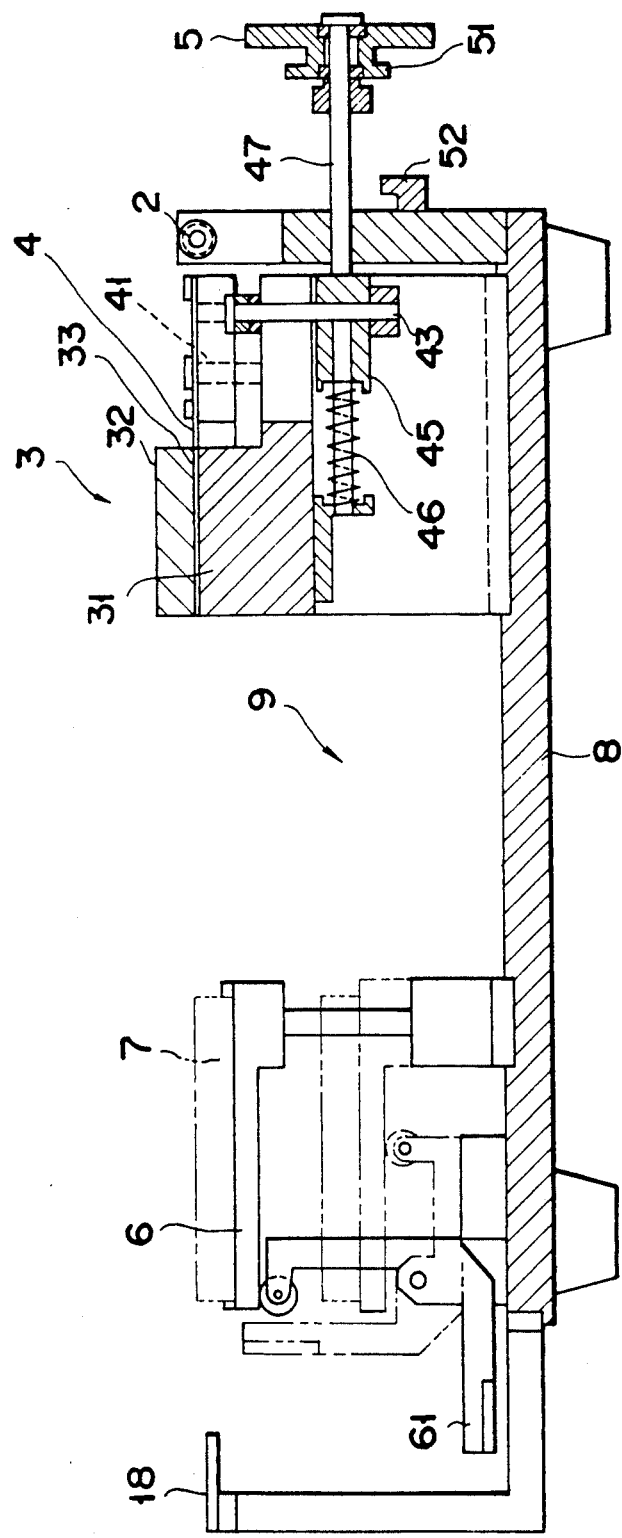
FIG. 14 is a sectional view showing the cable-aligning apparatus shown in FIG. 13.

In the cable-aligning apparatus 10 shown in FIGS. 2 and 3, the single-fiber cables of either group are held first lightly by the coil springs 2 and then firmly by the clamper 1. If the coil spring 2 located on the right side of the clamper 1 can alone firmly hold the single-fiber cables, neither the clamper 1 nor the other coil spring 2 located on the left side of the clamper 1 is required, as in a cable-aligning apparatus illustrated in FIGS. 13 and 14. When this apparatus is used, it is only the coil spring 2 that hold the cables while the operator pulling the cables, while pressing them down on the table 18, in order to align the them parallel to one another and spaced apart from one another. Hence, the operator must be careful, not to apply an excess tension on the cables, lest the cables are moved to the left, slipping through the gaps among turns of the coil spring 2. In this respect, the apparatus shown in FIGS. 13 and 14 is disadvantageous in comparison with the apparatus illustrated in FIGS. 2 and 3. Nevertheless, since it requires neither another coil spring nor the clamper 1, it is smaller and lighter than the apparatus shown in FIGS. 2 and 3.

Further, the elevator 6 can be replaced by a supporting table of a predetermined height level, which is fixedly mounted on the base plate 8. Moreover, table 18 can be omitted, though in such a case the ends of the fiber cables cannot be accurately aligned.

The cable-aligning apparatus shown in FIGS. 13 and 14 is operated in the same way as the apparatus illustrated in FIGS. 2 and 3, except that the single-fiber cables are not held by, or released from, a clamper. Also in view of this, the apparatus is advantageous over the cable-aligning apparatus which is illustrated in FIGS. 2 and 3.

Figure 15:
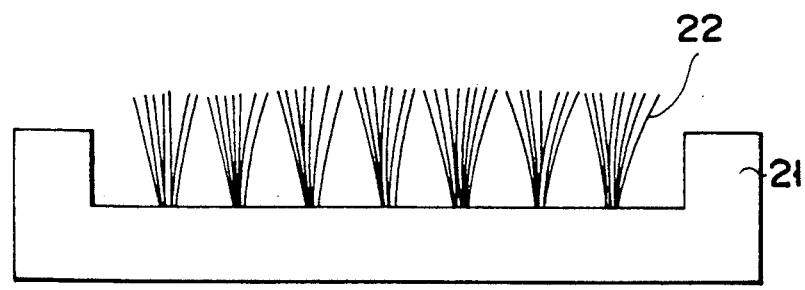
FIG. 15 illustrates a brush for holding single-fiber cables.

The cable-aligning apparatus 10 shown in FIGS. 2 and 3 has coil springs 2 for holding among their turns, the single-fiber cables of either group. These coil springs 2 can be replaced by such a brush 22 mounted on the base 21, as is illustrated in FIG. 15. This brush 22 performs the same function as the coil springs 2.

Figure 16:
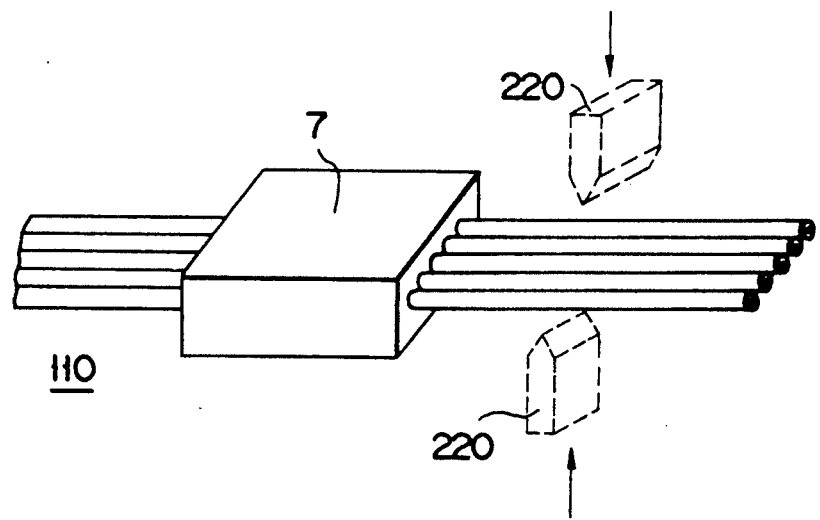
Figure 21:
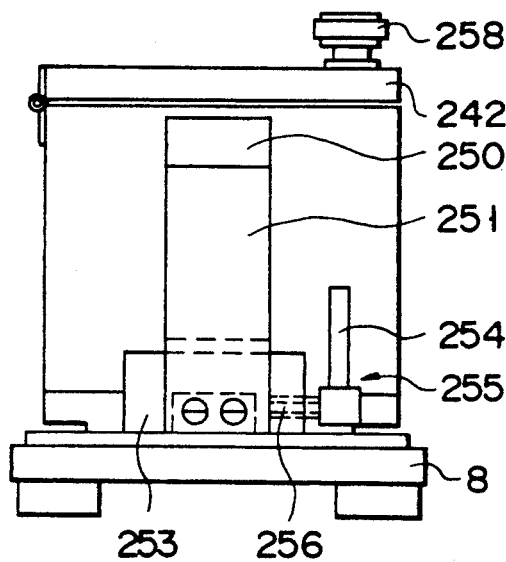
FIG. 21 is a left side view of the cable-aligning apparatus shown in FIG. 19.
Figure 22:
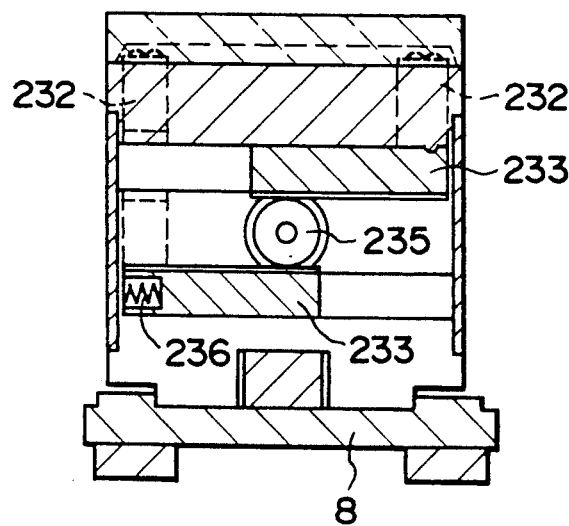
FIG. 22 is a sectional view showing the cable-aligning apparatus, taken along line XXII—XXII in FIG. 20.

With reference to FIGS. 16, 17, and 18, it will now be explained how the single-fiber cables of a first group are fusion-spliced to the single-fiber cables of a second group, by means of the fusion-splicing apparatus of the known type designed for fusion-splicing multi-fiber cables. FIGS. 16, 17, and 18 do not show the fusion-splicing apparatus in detail for simplicity of illustration.

First, as is illustrated in FIG. 16, the sheaths are removed from the end portions of the cables of a second group 110 held by a holder 7, at a time, by means of the sheath remover of the fusion-splicing apparatus, which comprises a pair of blades 220. More specifically, the blades 220, located one above the outer, are moved in the vertical direction, toward them until they bite into the sheaths of the cables. Then, the remover is moved in the horizontal direction as is indicated by the arrows in FIG. 16, thereby removing the sheaths, thereby exposing the end portions of the optical fibers. Although the cutting edge of either blade 220 appears straight in FIG. 16, it has semicircular grooves so that the blade 220 does not cut the optical fibers of the cables.

Next, as is shown in FIG. 17, the exposed end portions of the fibers are cut simultaneously by the cutter 221 of the fusion-splicing apparatus, so that they have flat faces.

Then, the sheaths are removed from the end portions of the single-fiber cables of a first group 100 by means of the sheath remover of the fusion-splicing apparatus, in the same way as the cables of the second group 110. Further, the exposed end portions of the fibers are cut by the cutter 221 of the fusion-splicing apparatus, so that they have flat faces, also in the same way as those of the optical fibers of the second group 110.

Thereafter, as is illustrated in FIG. 18, the end portions of the cables of the first group 100, held by the holder 7, and those of the cables of the second group 110, also held by the other holder 7, are placed on the support 222 of the fusion-splicing apparatus, in the same plane. The support 222 has a U-groove defining two flat portions 223 and 224 of the support 222. Two clampers (not shown) are mounted on the flat portions 223 and 224 of the support 222, respectively. The clampers on the flat portions 223 and 225 hold the exposed optical fibers of both groups 100 and 110, such that the fibers of the first group 100 are set opposite to, and in coaxial alignment with, those of the second group 110.

The fusion-splicing apparatus has a pair of electrodes 226 which oppose each other and extend into the U-groove of the support 222. A high voltage is applied across the electrodes for a predetermined time, thus generating an electrical arc between these electrodes. Because of this arc, the ends of the optical fibers of both group are heated, and fused together. Upon lapse of the predetermined time, the application of the voltage to the electrodes is stopped. The fused portions of each pair of optical fibers are cooled, whereby the single-fiber cables of the first group 100 are fusion-spliced to those of the second group 110, by means of the fusion-splicing apparatus.

A cable-aligning apparatus according to a further embodiment of this invention is shown in FIGS. 19–24.

In this embodiment, the link members used in the former-recited embodiment are replaced by pawl members 231. The pawl members 231 are moved by means of a rack and pinion arrangement. Specifically, the pawl member 231 are mounted on top of stem members 232 by means of screws 234. The stem members 232 are mounted on one ends of racks 233 by means of screws (not shown). The pawl members 231 are positioned on the cable-aligning table 3, and fiber cables are arranged between the pawl members 231. The racks 233 are engaged with a pinion 235. One of the racks 233 is pushed toward the center of the apparatus by means of a spring 236 provided between one end of the rack and the wall of the apparatus, so that the racks 233 are normally urged in directions opposite to each other and set in their normal positions. With the racks set in their normal positions, the pawl members 231 contact each other. A shaft 237 is fastened to the pinion 235. A handle 238 is fastened to the shaft 237.

When the handle 238 is rotated in a predetermined direction, the pinion 235 is rotated in the direction to move the racks 233 from their normal positions toward the outward of the apparatus. When the racks 233 are moved by a predetermined distance from the normal positions, a notch 239 formed in the side wall of one of the racks 233 is engaged with a projecting member 240 to hold the rack 233 at the position.

A recess 241 is formed in the inner surface of a cover 242 for the aligning table 3. The recess 241 accommodates the heads of the screws 234 mounting the pawl members 231 to the racks 233, when the cover 242 is set in the closed position. When the cover is set in the closed position, the gap formed between the base and the cover of the table 3 is substantially equal to the diameter of the cables 101 to 105, as in the previous embodiments. Therefore, none of the cables is forced upward such that it rode atop another.

The cover 242 has a knob 258 made of metal, and the aligning table 3 has a magnet 259 on the top. Therefore, the cover 241 is attracted to the aligning table 3, when set in the closed position, by means of the magnetic force of the magnet 259.

In the cable-aligning operation, the handle 238 is rotated in the predetermined direction to rotate the pinion 235 in the direction. With the rotation of the pinion 235, the racks 233 are moved toward the outward of the apparatus from the normal positions, so that the pawl members 231 are moved to the far from each other. When the racks are moved until the notch 239 of the rack is engaged with the projecting member 240, the racks are held at the positions. Then, the fiber cables are arranged on the aligning table 3 and between the pawl members 231. Thereafter, the handle 238 is rotated in the opposite direction so that the rack 233 is rendered to be out-of-engagement with the projecting member 240. With the out-of-engagement, the racks 233 are pushed toward the center of the apparatus by means of the spring 236, so that the pawl members 231 are to be closed to each other. Therefore, the fiber cables arranged between the pawl members 231 are put together and aligned parallel.

In this embodiment, supporting table 250 and supporting base 251 of the cable holder are retractable. Specifically, a slide member 252 is mounted on the lower portion of the supporting base 251. The slide member 252 is held by means of a holder 253, and can be slid on the base plate 8 of the apparatus. When the apparatus is not used, the supporting table 250 and the supporting base 251 are on the main plate 8 and abut on the side wall of the aligning table device, as shown in FIG. 19 and 20. In this non-use state of the apparatus, a lever 254 of a slider lock 255 is rotated downwardly, so that a locking shaft 256 abuts against the slide member 252 to lock the slide member.

Figure 23:
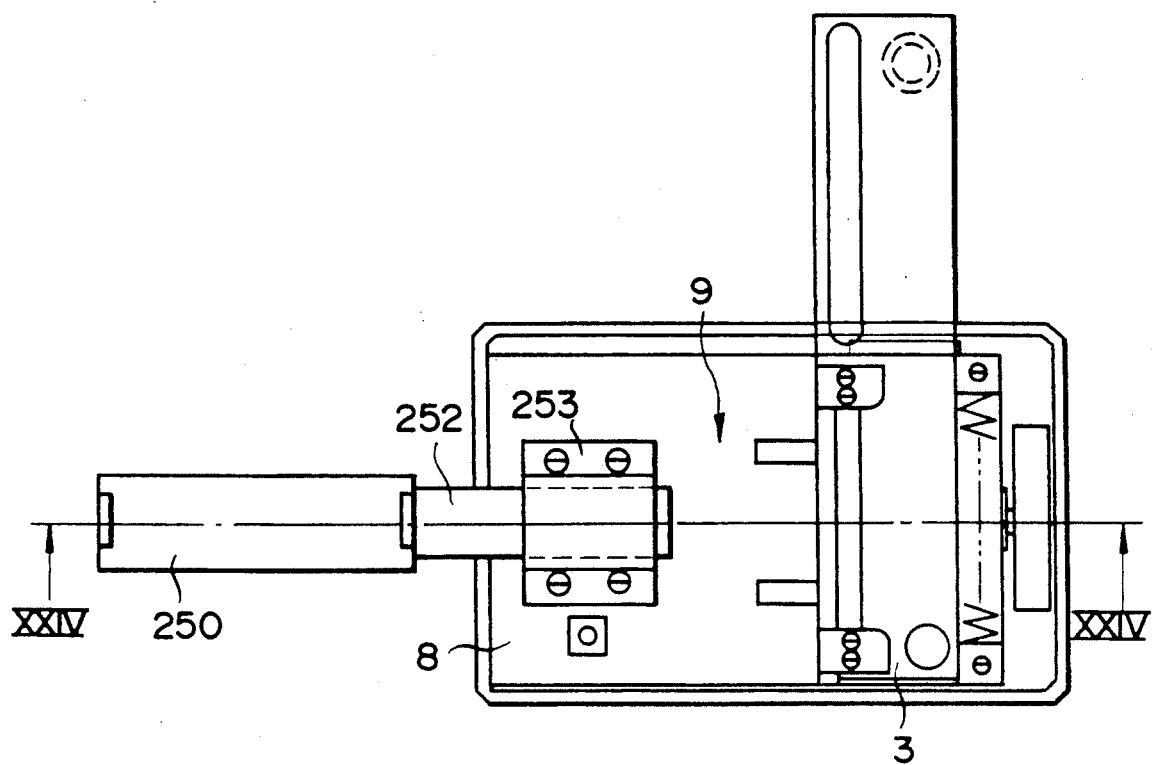
FIG. 23 is a plan view of the cable-aligning apparatus shown in FIG. 19, in which the cable holder supporting arrangement is moved outwardly.
Figure 24:
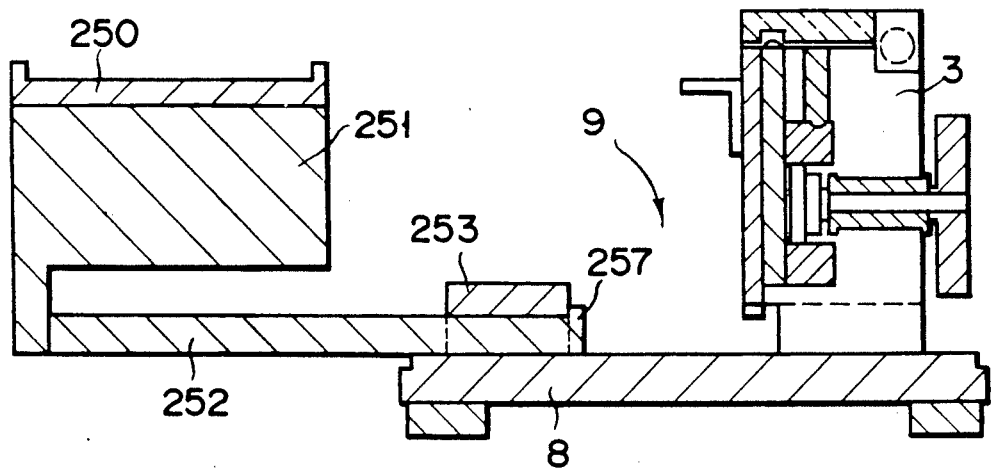
FIG. 24 is a sectional view showing the cable-aligning apparatus, taken along line XXIV—XXIV in FIG. 23.

When the apparatus is used, the supporting table 250 and the supporting base 251 are pulled outwardly, as shown in FIGS. 23 and 24. In this time, the slide member 252 is slide on the base plate 8, and moved outwardly via the slide holder 253 until the hook 257 of the slide member 252 is engaged with the front end of the slide holder 253. When the supporting table 250 and the supporting base 251 are fully pulled outwardly, a space 9 is formed between the supporting table 250 and the aligning table 3. The space 9 allows for the mounting of the reinforcing tubes onto the fiber cables.

Descriptions to those of the structure and the operation of this embodiment, which are similar to those as in the previous embodiments are omitted.

With this embodiment, since the rack and pinion arrangement is used, the entire structure is smaller than the former-recited apparatuses. Also is this embodiment, since the supporting arrangement for the cable holder is retractable, the structure is compact more than the former-recited apparatuses.

As has been described in detail, the present invention provides a method of simultaneously aligning a plurality of single-fiber cables in parallel by a simple operation without requiring long excess portions of the cables, making it possible to hold the cables, thus aligned, by means of a holder of the known type designed for holding a multi-fiber cable. This invention also provides an apparatus which is small and easy to operate, and can align a plurality of single-fiber cables in parallel to each other without requiring long excess portions of the cables, making it possible to hold the cables, thus aligned, by means of a holder of the known type designed for holding a multi-fiber cable.

This excess portion of each cable, which is required to align the cable parallel to the other cables by the method and apparatus according to the present invention, is shorter than is required in the conventional method and apparatus. Although this excess portion is about 40 mm long in the embodiments described above, it can be either shorter or longer than this exemplary value.

In addition, the present invention provides a method of simultaneously fusion-splicing the single-fiber cables of a group to those of another group, the cables of either group having been aligned parallel to one another by means of the cable-aligning apparatus according to the present invention.

What is claimed is:

1. A method of aligning a plurality of single-fiber cables, comprising the steps of:
    placing single-fiber cables on a base;
    closing a cover thereby inserting the single-fiber cables in a gap between the base and the cover, said gap being substantially equal to the diameter of said single-fiber cables;
    inserting a pair of arms in said gap; and
    moving said pair of arms in said gap, to align said single-fiber cables in the same plane.

2. The method according to claim 1, further comprising the step of holding the aligned single-fiber cables by means of a cable holder.

3. The method according to claim 1, further comprising the step of passing the single-fiber cables through reinforcing tubes, before or after the single-fiber cables are inserted in said gap.

4. A method of fusion-splicing a plurality of single-fiber cables, comprising the steps of:
    passing single-fiber cables of a first group through reinforcing tubes made of heat-shrinking material;
    aligning the cables of the first group and also the single-fiber cables of a second group, by means of a cable-aligning apparatus comprising
    a base,
    a cover hinged to said base and forming a gap along with the base when closed, said gap being substantially equal to the diameter of the single-fiber cables, and
    a pair of arms inserted in said gap and movable within said gap, for aligning the single-fiber cables in the same plane;
    holding the cables of both groups by means of two cable holders;
    setting the fiber holders in a fusion-splicing apparatus designed for fusion-splicing multi-fiber cables, such that the ends of the cables of the first group oppose those of the cables of the second group;
    operating the fusion-splicing apparatus, thereby fusion-splicing the cables of the first group simultaneously to the cables of the second group;
    moving the reinforcing tubes to the fusion-spliced portions of the cables of both groups, and
    heating the reinforcing tubes to shrink each tube, thereby simultaneously reinforcing the fusion-spliced portions of the cables of both groups.

5. The method according to claim 4, wherein said step of aligning the cables of either group comprises the steps of:
    placing single-fiber cables on the base of said cable-aligning apparatus;
    closing the cover of said cable-aligning apparatus, thereby inserting the single-fiber cables in a gap between the base and the cover, said gap being substantially equal to the diameter of the single-fiber cables; and
    moving the arms of said cable-aligning apparatus, thereby aligning the single-fiber cables in the same plane.

6. A method of aligning a plurality of single-fiber cables, comprising the steps of:
    placing single-fiber cables on a base;
    closing a cover thereby inserting the single-fiber cables in a gap between the base and the cover, said gap being substantially equal to the diameter of said single-fiber cables;
    inserting a pair of pawl members in said gap; and
    moving said pair of pawl members in said gap, to align said single-fiber cables in the same plane.

7. The method according to claim 6, further comprising the step of holding the aligned single-fiber cables by means of a cable holder.

8. The method according to claim 6, further comprising the step of passing the single-fiber cables through reinforcing tubes, before or after the single-fiber cables are inserted in said gap.

9. A method of fusion-splicing a plurality of single-fiber cables, comprising the steps of:

passing single-fiber cables of a first group through reinforcing tubes made of heat-shrinking material;

aligning the cables of the first group and also the single-fiber cables of a second group, by means of a cable-aligning apparatus comprising a base, a cover hinged to said base and forming a gap along with the base when closed, said gap being substantially equal to the diameter of the single-fiber cables, and a pair of pawl members inserted in said gap and movable within said gap, for aligning the single-fiber cables in the same plane;

holding the cables of both groups by means of two cable holders;

setting the fiber holders in a fusion-splicing apparatus designed for fusion-splicing multi-fiber cables, such that the ends of the cables of the first group oppose those of the cables of the second group;

operating the fusion-splicing apparatus, thereby fusion-splicing the cables of the first group simultaneously to the cables of the second group;

moving the reinforcing tubes to the fusion-spliced portions of the cables of both groups, and heating the reinforcing tubes to shrink each tube, thereby simultaneously reinforcing the fusion-spliced portions of the cables of both groups.

10. The method according to claim 9, wherein said step of aligning the cables of either group comprises the steps of:

placing single-fiber cables on the base of said cable-aligning apparatus;

closing the cover of said cable-aligning apparatus, thereby inserting the single-fiber cables in a gap between the base and the cover, said gap being substantially equal to the diameter of the single-fiber cables; and moving the pawl members of said cable-aligning apparatus, thereby aligning the single-fiber cables in the same plane.

* * * * *